US007503849B2

(12) United States Patent
Hornik et al.

(10) Patent No.: US 7,503,849 B2
(45) Date of Patent: Mar. 17, 2009

(54) WAGERING GAME WITH SIDE-WAGERING FEATURE ON CERTAIN OUTCOMES

(75) Inventors: Jeremy M. Hornik, Chicago, IL (US); Dion K. Aoki, Henderson, NV (US); Joel R. Jaffe, Evanston, IL (US); James J. Poole, Chalfont St. Giles (GB)

(73) Assignee: WMS Gaming, Waukegan, IL (US)

( * ) Notice: Subject to any disclaimer, the term of this patent is extended or adjusted under 35 U.S.C. 154(b) by 532 days.

(21) Appl. No.: 11/083,849

(22) Filed: Mar. 18, 2005

(65) Prior Publication Data

US 2006/0211484 A1 Sep. 21, 2006

(51) Int. Cl.
*A63F 13/10* (2006.01)

(52) U.S. Cl. .......................................... 463/20

(58) Field of Classification Search ............. 463/13–20, 463/25, 40–42

See application file for complete search history.

(56) References Cited

U.S. PATENT DOCUMENTS

| | | | | |
|---|---|---|---|---|
| 5,632,485 | A | 5/1997 | Woodland et al. | 273/292 |
| 5,720,662 | A | 2/1998 | Holmes, Jr. et al. | 463/20 |
| 5,851,148 | A | 12/1998 | Brune et al. | 463/25 |
| 6,068,552 | A | 5/2000 | Walker et al. | 463/21 |
| 6,110,041 | A | 8/2000 | Walker et al. | 463/20 |
| 6,120,378 | A | 9/2000 | Moody et al. | 463/20 |
| 6,159,095 | A | 12/2000 | Frohm et al. | 463/19 |
| 6,179,711 | B1 * | 1/2001 | Yoseloff | 463/25 |
| 6,203,429 | B1 | 3/2001 | Demar et al. | 463/20 |
| 6,210,277 | B1 | 4/2001 | Stefan | 463/27 |
| 6,227,969 | B1 | 5/2001 | Yoseloff | 463/13 |
| 6,237,916 | B1 | 5/2001 | Webb | 273/292 |
| 6,254,481 | B1 | 7/2001 | Jaffee | 463/20 |
| 6,270,411 | B1 | 8/2001 | Gura et al. | 463/20 |
| 6,290,600 | B1 | 9/2001 | Glasson | 463/20 |
| 6,419,579 | B1 | 7/2002 | Bennett | 463/20 |
| 6,520,856 | B1 | 2/2003 | Walker et al. | 463/21 |
| 6,561,904 | B2 | 5/2003 | Locke et al. | 463/25 |
| 6,746,328 | B2 | 6/2004 | Cannon et al. | 463/17 |
| 6,793,578 | B2 | 9/2004 | Luccesi et al. | 463/20 |

(Continued)

FOREIGN PATENT DOCUMENTS

WO WO 97/19736 A1 6/1997

(Continued)

OTHER PUBLICATIONS

WMS Gaming Inc; "Big Bang Piggy Bankin"™, *Product Sheet*, (undated), 1 page, Chicago, Illinois (Approx. 1997).

(Continued)

*Primary Examiner*—Scott E Jones

(57) ABSTRACT

A gaming system for playing a basic wagering game on a gaming terminal. The gaming system includes an input device adapted to receive an input from a player of a basic wagering game and output a signal to a controller. A controller is configured to randomly select a basic wagering game outcome from a plurality of basic wagering game outcomes. A gaming feature is also provided. In this gaming feature, an extra wager may be input in association therewith to increase an award for a selected basic wagering game winning outcome, a plurality of selected basic wagering game winning outcomes, or a selected group and related subgroup of basic wagering game winning outcomes.

22 Claims, 6 Drawing Sheets

U.S. PATENT DOCUMENTS

| | | | | |
|---|---|---|---|---|
| 6,960,133 | B1 | 11/2005 | Marks et al. | 463/20 |
| 2002/0020965 | A1 | 2/2002 | Potter | 273/274 |
| 2002/0055382 | A1 | 5/2002 | Meyer | 463/20 |
| 2002/0086725 | A1 | 7/2002 | Fasbender et al. | 463/11 |
| 2002/0142825 | A1 | 10/2002 | Lark et al. | 463/16 |
| 2002/0142846 | A1 | 10/2002 | Paulsen | 463/43 |
| 2002/0155881 | A1 | 10/2002 | Yoshida | 463/20 |
| 2002/0196342 | A1 | 12/2002 | Walker et al. | 348/157 |
| 2003/0027626 | A1* | 2/2003 | Marks et al. | 463/20 |
| 2003/0064797 | A1 | 4/2003 | Jackson et al. | 463/25 |
| 2003/0064800 | A1 | 4/2003 | Jackson et al. | 463/30 |
| 2003/0119579 | A1 | 6/2003 | Walker et al. | 463/20 |
| 2003/0162585 | A1 | 8/2003 | Bigelow et al. | 463/20 |
| 2003/0216169 | A1 | 11/2003 | Walker et al. | 463/25 |
| 2004/0053683 | A1 | 3/2004 | Hartl et al. | 463/25 |
| 2004/0092299 | A1 | 5/2004 | Gauselmann | 463/16 |
| 2004/0092300 | A1 | 5/2004 | Gauselmann | 463/16 |
| 2004/0100025 | A1 | 5/2004 | Conklin et al. | 273/292 |
| 2004/0219968 | A1 | 11/2004 | Fiden el al. | 463/20 |
| 2004/0219969 | A1 | 11/2004 | Casey et al. | 463/20 |
| 2004/0242316 | A1 | 12/2004 | Oles et al. | 463/20 |
| 2004/0266507 | A1 | 12/2004 | Cooper | 463/13 |
| 2005/0054412 | A1 | 3/2005 | Gauselmann | 463/16 |
| 2005/0130731 | A1 | 6/2005 | Englman et al. | 463/20 |
| 2005/0130737 | A1 | 6/2005 | Englman et al. | 463/20 |
| 2006/0211484 | A1 | 9/2006 | Hornik et al. | 463/25 |

FOREIGN PATENT DOCUMENTS

| | | | |
|---|---|---|---|
| WO | WO 00/32286 | A1 | 6/2000 |
| WO | WO 01/15055 | A1 | 3/2001 |
| WO | WO 01/33478 | A1 | 5/2001 |
| WO | WO 02/054331 | | 7/2002 |
| WO | WO 03/089084 | A1 | 10/2003 |

OTHER PUBLICATIONS

WMS Gaming Inc; “Stroke Of Luck”™, *Product Sheet*, (undated), 1 page, Chicago, Illinois (Approx. 1997).

WMS Gaming Inc; “Top Cat”™, *Product Sheet*, (undated), 1 page, Chicago, Illinois (Approx. 1997).

WMS Gaming Inc; “Winning Streak”™, *Product Sheet*, (undated), 1 page, Chicago, Illinois (Approx. 1997).

* cited by examiner

FIG. 3(a)
HYPOTHETICAL PAY TABLE

| TYPE | 9 LINE | 5 REEL | | | |
|---|---|---|---|---|---|
| | WIN COMBINATIONS | | | | PAY |
| CHERRY | | | | | |
| cherry | cherry | cherry | cherry | cherry | 50000 |
| cherry | cherry | cherry | cherry | | 10000 |
| cherry | cherry | cherry | | | 1000 |
| cherry | cherry | | | | 100 |
| | | | | | |
| PLUM | | | | | |
| plum | plum | plum | plum | plum | 5000 |
| plum | plum | plum | plum | | 500 |
| plum | plum | plum | | | 100 |
| plum | plum | | | | 25 |
| | | | | | |
| APPLE | | | | | |
| apple | apple | apple | apple | apple | 600 |
| apple | apple | apple | apple | | 125 |
| apple | apple | apple | | | 50 |
| apple | apple | | | | 5 |
| | | | | | |
| KIWI | | | | | |
| kiwi | kiwi | kiwi | kiwi | kiwi | 500 |
| kiwi | kiwi | kiwi | kiwi | | 100 |
| kiwi | kiwi | kiwi | | | 30 |
| kiwi | kiwi | | | | 3 |
| | | | | | |
| ORANGE | | | | | |
| orange | orange | orange | orange | orange | 500 |
| orange | orange | orange | orange | | 100 |
| orange | orange | orange | | | 30 |
| orange | orange | | | | 3 |
| | | | | | |
| MIXED SYMBOLS | | | | | |
| mixed | mixed | mixed | mixed | mixed | 50 |
| mixed | mixed | mixed | mixed | | 20 |
| mixed | mixed | mixed | | | 5 |
| | | | | | |
| MELON | | | | | |
| melon | melon | melon | melon | melon | 300 |
| melon | melon | melon | melon | | 70 |
| melon | melon | melon | | | 20 |
| | | | | | |
| LEMON | | | | | |
| lemon | lemon | lemon | lemon | lemon | 250 |
| lemon | lemon | lemon | lemon | | 60 |
| lemon | lemon | lemon | | | 15 |
| | | | | | |
| PEAR | | | | | |
| pear | pear | pear | pear | pear | 250 |
| pear | pear | pear | pear | | 60 |
| pear | pear | pear | | | 15 |
| | | | | | |
| TANGERINE | | | | | |
| tangerine | tangerine | tangerine | tangerine | tangerine | 100 |
| tangerine | tangerine | tangerine | tangerine | | 40 |
| tangerine | tangerine | tangerine | | | 10 |

| TYPE | 9 LINE | 5 REEL | | | |
|---|---|---|---|---|---|
| | WIN COMBINATIONS | | | | PAY |
| CHERRY | | | | | |
| cherry | cherry | cherry | cherry | cherry | 75000 |
| cherry | cherry | cherry | cherry | | 15000 |
| cherry | cherry | cherry | | | 2000 |
| cherry | cherry | | | | 200 |

FIG. 3(b)
HYPOTHETICAL PAY TABLE

| TYPE | 9 LINE | 5 REEL | | | |
|---|---|---|---|---|---|
| | WIN COMBINATIONS | | | | PAY |
| CHERRY | | | | | |
| cherry | cherry | cherry | cherry | cherry | 250000 |
| cherry | cherry | cherry | cherry | | 50000 |
| cherry | cherry | cherry | | | 2500 |
| cherry | cherry | | | | 300 |

FIG. 3(c)
HYPOTHETICAL PAY TABLE

WAGERING GAME WITH SIDE-WAGERING FEATURE ON CERTAIN OUTCOMES

TECHNICAL FIELD

The present disclosure relates generally to wagering games and, more particularly, to a wagering game with a side-wagering feature on certain outcomes.

BACKGROUND

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines available because such machines attract frequent play and, hence, increase profitability to the operator. In the competitive gaming machine industry, there is a continuing need for gaming machine manufacturers to produce new types of games, or enhancements to existing games, which will attract frequent play by increasing the entertainment value and excitement associated with the game.

One concept that has been successfully employed to enhance the entertainment value of a game is that of a "secondary" or "bonus" game which may be played in conjunction with a "basic" game. The bonus game, which is entered upon the occurrence of a selected event or outcome of the basic game, may comprise any type of game, either similar to or completely different from the basic game. Such a bonus game produces a significantly higher level of player excitement than the basic game because it provides a greater expectation of winning than the basic game.

While some game features provide some enhanced excitement, there is a continuing need to develop new game features to satisfy the demands of players and operators. Preferably, such new game features will further enhance the level of player excitement. The present invention is directed to satisfying these needs in that it provide a game feature enabling players to, for an extra side wager, increase their winnings on certain outcomes of the base game.

SUMMARY

The present concepts are directed to a wagering game with a side-wagering feature on certain outcomes.

In one aspect, a gaming system is provided for playing a basic wagering game on a gaming terminal. The gaming system includes an input device adapted to receive an input from a player of a basic wagering game and output a signal to a controller. A controller is configured to randomly select a basic wagering game outcome from a plurality of basic wagering game outcomes. A gaming feature is also provided. In this gaming feature, an extra wager may be input in association therewith to increase an award for a selected basic wagering game winning outcome, a plurality of selected basic wagering game winning outcomes, or a selected group and related subgroup of basic wagering game winning outcomes.

In another aspect, a gaming system is provided for playing a basic wagering game. The gaming system includes a gaming terminal with a display for displaying a basic wagering game and a basic wagering game outcome. The basic wagering game has a plurality of basic wagering game outcomes, a subset of which correspond to winning outcomes in the basic wagering game. The basic wagering game includes a gaming feature for increasing an award for a basic wagering game winning outcome if a specified combination of symbols appears along a payline. The specified combination of symbols along a payline comprise a selected basic wagering game winning combination, a plurality of selected basic wagering game winning combinations, and/or a selected related group and subgroup of basic wagering game winning combinations. The gaming feature is enabled by input of an additional wager. A controller associated with the gaming terminal is configured, upon execution of corresponding instructions, to randomly select a basic wagering game outcome from a plurality of basic wagering game outcomes, determine whether the randomly selected basic wagering game outcome corresponds to a winning combination in the basic wagering game, determine whether the gaming feature is enabled, and determine, for an enabled gaming feature, whether the randomly selected basic wagering game outcome comprises the specified combination of symbols along a payline.

In still another aspect, there is provided a method of operating a gaming terminal including the steps of attributing a first wager from a player for a basic wagering game on the gaming terminal to at least one payline, receiving a second wager, and enabling a gaming feature associated with the basic wagering game. The method further includes the steps of associating the enabled gaming feature with a specified combination of symbols comprising a selected basic wagering game outcome, a plurality of selected basic wagering game outcomes, and/or a selected group and related subgroup of basic wagering game combinations from a plurality of basic wagering game winning outcomes.

The above summary of the present concepts is not intended to represent each embodiment, or every aspect, of the present concepts, which are set forth by way of example in the accompanying detailed description and figures and which are defined by the claims.

BRIEF DESCRIPTION OF THE DRAWINGS

The following drawings are provided to illustrate various aspects of the concepts detailed herein, wherein:

FIGS. 3(*a*)-(*c*) show examples of a hypothetical pay table representing aspects of the present concepts.

Figure 1:
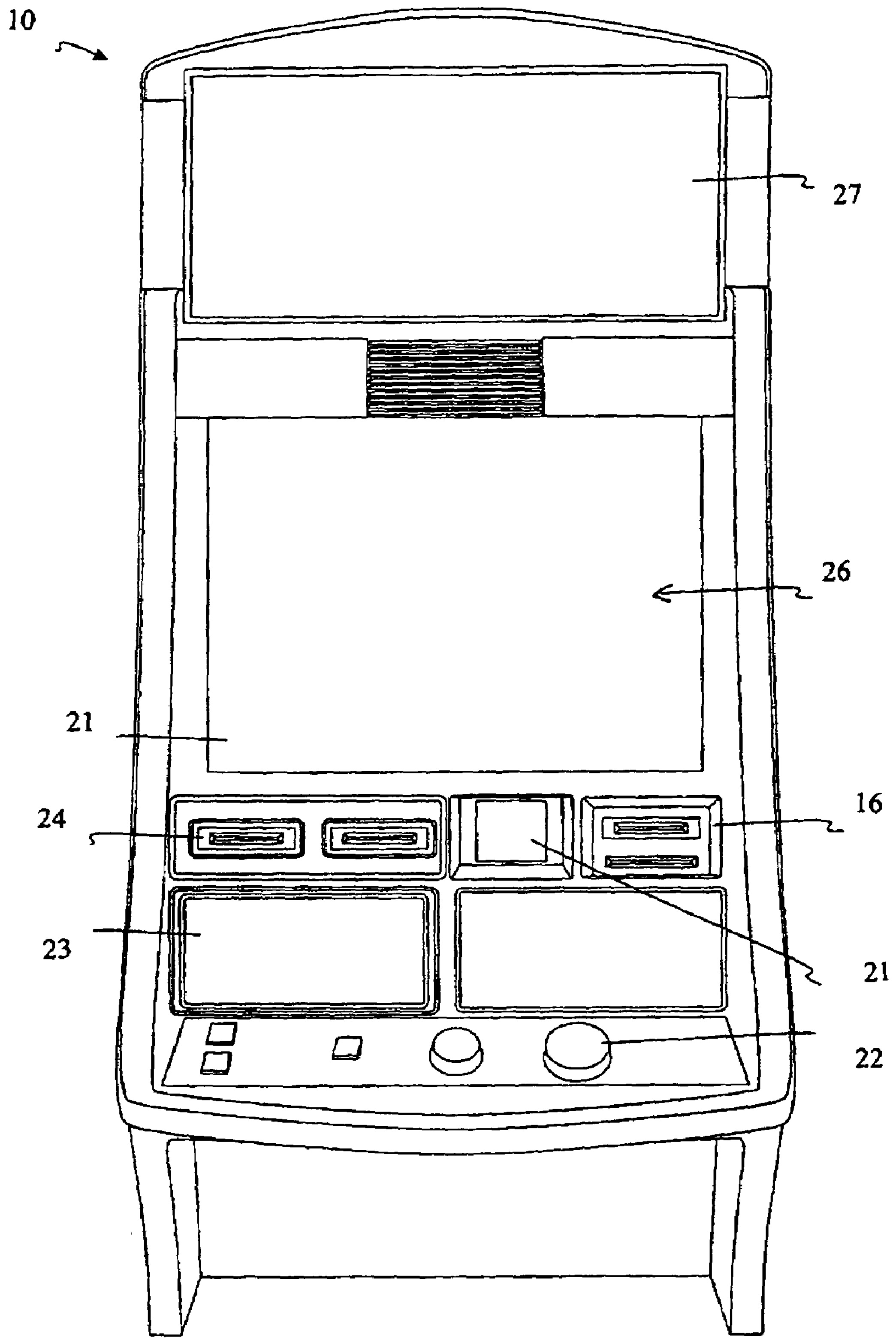
FIG. 1 illustrates a gaming terminal which may be used in accord with the present concepts.

While the present concepts are susceptible to various modifications and alternative forms, specific embodiments have been shown by way of example in the drawings and will be described in detail herein. It should be understood that the present concepts are not intended to be limited to the particular forms disclosed, but are intended to include all modifications, equivalents, and alternatives falling within the spirit and scope of the present concepts disclosed herein.

DETAILED DESCRIPTION

The following examples relate generally to wagering games and, more particularly, to a wagering game with a side-wagering feature on certain outcomes.

FIG. 1 shows a representation of an exemplary gaming terminal 10 according to embodiments of the invention. The gaming terminal 10 may be operated as a stand-alone terminal, or it may be connected to a network of gaming terminals. Further, the gaming terminal 10 may be any type of gaming terminal and may have varying structures and methods of operation. For example, the gaming terminal 10 may be a mechanical gaming terminal configured to play mechanical slots, or it may be an electromechanical or electrical gaming terminal configured to play a basic wagering game such as, but not limited to, blackjack, slots, keno, and poker, and any other associated games (e.g., bonus games having a board-game theme or video-based game theme). The gaming terminal 10 is typically associated with a basic or base wagering game in which players are awarded a prize (e.g., cash, credits, gifts certificates, etc.) for achieving a winning combination or event. Prizes may also include entry into another game, such as a secondary game, bonus game, or progressive game, which provides further opportunity for an award, used generically herein to refer to any benefit bestowed upon a player regardless of terminology, form (e.g., enhanced odds of attaining an award), and/or amount.

Figure 2:
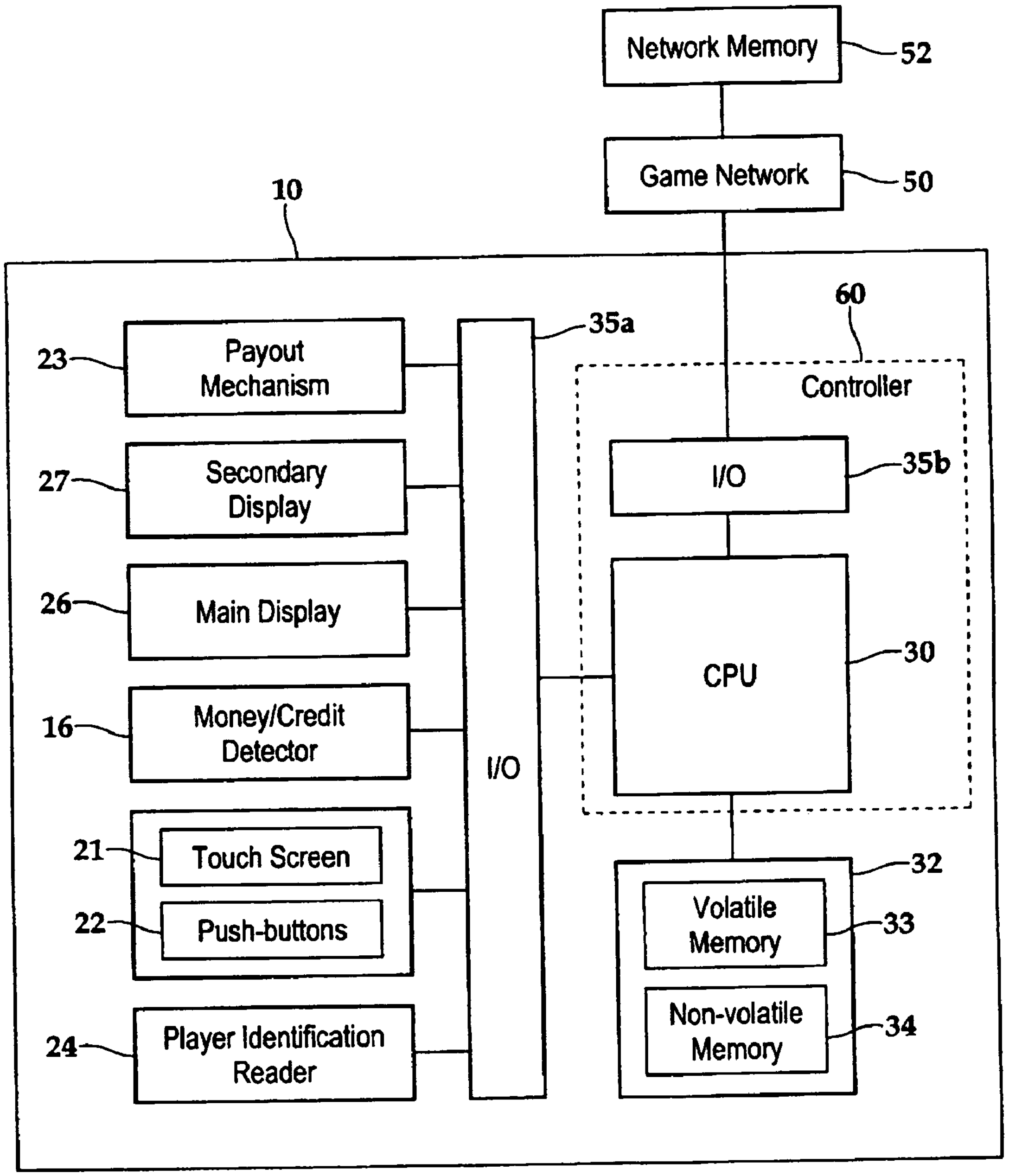
FIG. 2 shows a functional depiction of the gaming terminal shown in FIG. 1 in accord with one aspect of the present concepts.

Gaming terminal 10 includes one or more processors, such as a central processing unit (CPU) 30, which executes one or more programs, routines, sub-routines and/or instruction sets, collectively referred to herein as a gaming control system, controlling play of the wagering game and any other games or functions associated therewith. These programs, routines, and/or instruction sets operate in combination with the CPU 30, or the like, to determine a random outcome for and to control play of the wagering game and any other games or functions associated with the gaming terminal 10, and to control or interact with any associated input and/or output devices connected therewith. The gaming terminal 10 may include, as shown in FIG. 2, a storage unit 32 that includes one or more volatile memories 33 (e.g., a random-access memory (RAM)) and/or non-volatile memories 34 (e.g., hard drive, optical drive, an EEPROM). The gaming terminal 10 and associated gaming control system is capable of locally executing and displaying various wagering games including, but not limited to, a slot machine game, a lottery game, a card game and other conventional types of terminal-level and networked or remote wagering games.

As shown, the gaming terminal 10 includes input devices, such as a wager acceptor 16 (shown as a card wager acceptor 16*a* and a cash wager accepter 16*b*), a touch screen 21, a push-button panel 22, and an information reader 24. For outputs, the gaming terminal 10 includes a payout mechanism 23, a main display 26 for displaying information about the basic wagering game, and a secondary display 27 that may display an electronic version of a pay table, and/or also possibly game-related information or other entertainment features. While these typical components found in the gaming terminal 10 are described below, it should be understood that numerous other elements may exist and may be used in any number of combinations to create various forms of a gaming terminal.

The wager acceptor 16 may be provided in many forms, individually or in combination. The cash wager acceptor 16*a* may include a coin slot acceptor or a note acceptor to input value to the gaming terminal 10. The card wager acceptor 16*b* may include a card-reading device for reading a card that has a recorded monetary value with which it is associated. The card wager acceptor 16*b* may also receive a card that authorizes access to a central account, which can transfer money to the gaming terminal 10.

Also included is the payout mechanism 23, which performs the reverse functions of the wager acceptor. For example, the payout mechanism 23 may include a coin dispenser or a note dispenser to output value from gaming terminal 10. Also, the payout mechanism 23 may also be adapted to receive a card that authorizes the gaming terminal to transfer credits from the gaming terminal 10 to a central account.

The push button panel 22 is typically offered, in addition to the touch screen 21, to provide players with an option on how to make their game selections. Alternatively, the push button panel 22 provides inputs for one aspect of operating the game, while the touch screen 21 allows for inputs needed for another aspect of operating the game.

The outcome of the basic wagering game is displayed to the player on the main display 26. The main display 26 may take the form of a cathode ray tube (CRT), a high resolution LCD, a plasma display, LED, or any other type of video display suitable for use in the gaming terminal 10. As shown, the main display 26 includes the touch screen 21 overlaying the entire monitor (or a portion thereof) to allow players to make game-related selections. Alternatively, the gaming terminal 10 may have a number of mechanical reels to display the game outcome, as well.

In some embodiments, the information reader 24 is a card reader that allows for identification of a player by reading a card with information indicating his or her true identity. Currently, identification is used by casinos for rewarding certain players with complimentary services or special offers. For example, a player may be enrolled in the gaming establishment's players' club and may be awarded certain complimentary services as that player collects points in his or her player-tracking account. The player inserts his or her card into the player-identification card reader 24, which allows the casino's computers to register that player's wagering at the gaming terminal 10. The information reader 24 may also include a keypad (not shown) for entering a personal identification number (PIN). The gaming terminal 10 may require that the player enter their PIN prior to obtaining information. The gaming terminal 10 may use the secondary display 27 for providing the player with information about his or her account or other player-specific information. Also, in some embodiments, the information reader 24 may be used to restore assets that the player achieved during a previous game session and had saved.

As shown in FIG. 2, the various components of the gaming terminal 10 are controlled by a central processing unit (CPU) 30 (such as a microprocessor or microcontroller). To provide the gaming functions, the CPU 30 executes a game program that allows for the randomly selected outcome. The CPU 30 is also coupled to or includes a local memory 32. The local memory 32 may comprise a volatile memory 33 (e.g., a random-access memory (RAM)) and a non-volatile memory 34 (e.g., an EEPROM). It should be appreciated that the CPU 30 may include one or more microprocessors. Similarly, the local memory 32 may include multiple RAM and multiple program memories.

Communications between the peripheral components of the gaming terminal 10 and the CPU 30 occur through input/output (I/O) circuits 35*a*. As such, the CPU 30 also controls and receives inputs from the peripheral components of the gaming terminal 10. Further, the CPU 30 communicates with external systems via the I/O circuits 35*b*. Although the I/O circuits 35 may be shown as a single block, it should be appreciated that the I/O circuits 35 may include a number of different types of I/O circuits.

In some embodiments, the CPU 30 may not be inside the gaming terminal 10. Instead, the CPU 30 may be part of a game network 50 (FIG. 2) and may be used to control numerous gaming terminals 10. In these embodiments, the CPU 30 will run the basic games for each of the gaming terminals 10, and may also be used to link the gaming terminals 10 together. In one example, the game network 50 can include progressive jackpots that are contributed to by all or some of the gaming terminals 10 in the network (e.g., terminal-level jackpots that only each terminal 10 contributes to, bank-level jackpots that are contributed to by all of the terminals 10 in a particular bank, and wide-area jackpots that are contributed to by a larger number of terminals 10, such as multiple banks). Alternatively, the game network 50 can allow the player to retrieve assets obtained while playing one terminal 10 at a different gaming terminal that is also part of the game network. Assets may be any number of things, including, but not limited to, monetary or non-monetary awards, or features that a player builds up in a bonus or progressive game to win awards.

Information reader 24 may include a card reader configured to read a card input by the user, such as a personal identification card or casino gaming card. Alternatively, the gaming terminal 10 information reader 24 may include a radio frequency identification device (RFID) transceiver or receiver so that an RFID transponder held by the player can be used to provide the information to the gaming terminal 10 without the need to insert a card into the gaming terminal. RFID components can be those available from Pacific Northwest National Laboratory (under the United States Department of Energy) of Richland, Wash. The information reader 24 may also include a biometric reader, such as a finger, hand, retina scanner, voice analyzer, or facial recognition system, to permit association of a unique identifier of the player to a stored value.

The gaming terminal 10 and associated gaming control system is capable of executing wagering games on or through a controller 60. Controller 60, as used herein, comprises any combination of hardware, software, and/or firmware that may be disposed or resident inside and/or outside of a gaming terminal 10 or like machine which may communicate with and/or control the transfer of data between the gaming terminal and a bus, another computer, processor, or device, and/or a service and/or a network. The network may include, but is not limited to a peer-to-peer, client/server, master/slave, star network, ring network, bus network, or other network architecture wherein at least one processing device (e.g., computer) is linked to at least one other processing device. The controller 60, as used herein, may comprise one or more controllers. In one implementation, each gaming terminal 10 comprises, or is connected to, a controller 60 enabling each gaming terminal 10 to transmit and/or receive signals, preferably both, in a peer-to-peer arrangement. In another example, the controller 60 may be adapted to facilitate communication and/or data transfer for one or more gaming terminals 10 in a client/server or centralized arrangement. In one aspect, shown in FIG. 2, the controller 60 comprises a NIU (Network Interface Unit) connecting the gaming terminal 10 via a conventional I/O port and communication path (e.g. serial, parallel, IR, RC, 10bT, etc.) to a game network 50, which may include, for example, other gaming terminals connected together in the network 50.

In accord with the present concepts, the player may, for an extra wager (e.g., one token or credit), enable the gaming feature to increase an award for a selected wagering game outcome comprising a related subgroup of combinations from the plurality of potential game outcomes. The specified combination of symbols may include any potential winning outcome, including those that are sequential or scattered (non-sequential or non-adjacent) along a payline. The extra wager effectively alters the pay table, or a selected portion thereof, for a subsequent play of the basic game and increases the payout of selected winning combinations and/or subgroups thereof. In one general example, certain winning combinations are enhanced, such as a 4 symbol or 5 symbol combination on a reel-based game or a straight or a 4-of-a-kind in a card based reel-based or video-based poker game. Subgroups of these winning combinations may also be selectively enhanced, as described below.

FIG. 3(*a*) shows a hypothetical pay table identifying various winning combinations of symbols in a 5-reel, 9-payline hypothetical basic game utilizing fruit symbols. The illustrated payouts are provided for illustration and are not intended to limit, in any way, the actual payout values, nor is the representation of the game intended to be limiting of combinations of winning outcomes or of game symbols or game types. The various symbols represented in FIG. 3(*a*) include "CHERRY", "PLUM" "APPLE," "KIWI," "ORANGE," "MELON," "LEMON," "PEAR," and "TANGERINE." The "WIN COMBINATIONS" column identifies the various win combinations which may occur by symbols stopping on an active payline. Although potential scattered combinations are not represented in FIGS. 3(*a*)-(*c*), for brevity, such combinations could include, for example, a 4-of-a-kind along a payline comprising the symbols of "CHERRY," "CHERRY," "CHERRY," "ANY" and "CHERRY." Likewise, the "ANY" symbol (e.g., "PLUM," "KIWI," etc.) could be disposed in another position to the same effect. In another aspect of the present concepts, the gaming feature to increase an award for a selected wagering game outcome may comprise a related subgroup of combinations from the plurality of potential game outcomes may include a "MIXED SYMBOL PAY," wherein the winning combination or subgroup thereof includes specified pre-determined mixtures or combinations of the symbols.

In the example of FIG. 3(*a*), winning combinations require that at least two of five corresponding symbols be displayed, left to right, starting on the leftmost reel (designated Reel number 1) on an active payline. For example, two "CHERRY" symbols displayed on adjacent reels (e.g., reels 1 and 2) would be a winning combination. The "MIXED SYMBOL" combination is satisfied by any combination of three or more "APPLE," "KIWI" and "ORANGE" symbols stopping on an active payline, left to right, starting on reel 1. For example, a "KIWI" symbol on reel 1, followed by a "ORANGE" symbol on reel 2 and another "KIWI" symbol on reel 3 would be a winning "MIXED SYMBOL" combination.

The "PAY" column of FIG. 3(*a*) identifies the amount of coin(s) or credit(s) awarded for the various winning combinations in the basic game, per unit wagered. Thus, for example, the "CHERRY," "CHERRY" combination appearing on reels 1 and 2 will pay 100 coins or credits with one coin played. That same combination will pay 500 coins or credits with five coins played.

In view of this background, the extra wager input by the player at the gaming terminal 10 alters the pay table, or a selected portion thereof, for a subsequent play of the basic game and increases the payout of selected winning combinations and/or subgroups thereof. As shown in FIG. 3(*b*), the extra wager increases the per unit wager payout of each of the winning combinations including sequential combinations of two or more "CHERRY" symbols in the order and number indicated. FIG. 3(*c*) shows that the extra wager increases the per unit wager payout of selected ones of the winning combinations including sequential combinations of three or more "CHERRY" symbols in the order and number indicated. Thus, a player can place the extra wager to increase the payout for any selected winning combination (e.g., a 4-of-a-kind) or any selected subgroup of winning combinations (e.g., any winning combination comprising a "CHERRY"). In the example of FIGS. 3(*b*)-3(*c*), where there are five winning combinations in the "CHERRY" category, the player may place the extra wager on any grouping of the winning combinations. In one aspect, the winning combination or subgroup of winning combinations may be selectable by the player of the gaming terminal 10. In another aspect, the winning combination or subgroup of winning combinations or may be selectively enabled based on factors such as the amount of the extra wager, the amount of the initial wager, and/or the number of paylines selected and enabled by the player.

As noted above, the extra wager may be placed on any grouping of the winning combinations. In one aspect, the extra wager may be placed on winning combinations including both the "CHERRY," "PLUM" and "KIWI" groups, or subgroupings thereof. For example, the extra wager input may increase, through the gaming feature, the per unit wager payout of each of the winning combinations including sequential combinations of four or more "CHERRY," "PLUM," or "KIWI" symbols in the order indicated. Subgroups of these winning combinations may also be included. The examples of FIGS. 3(*a*)-(*c*) are not intended to be limiting in any manner and are merely intended to be exemplary.

Figure 4:
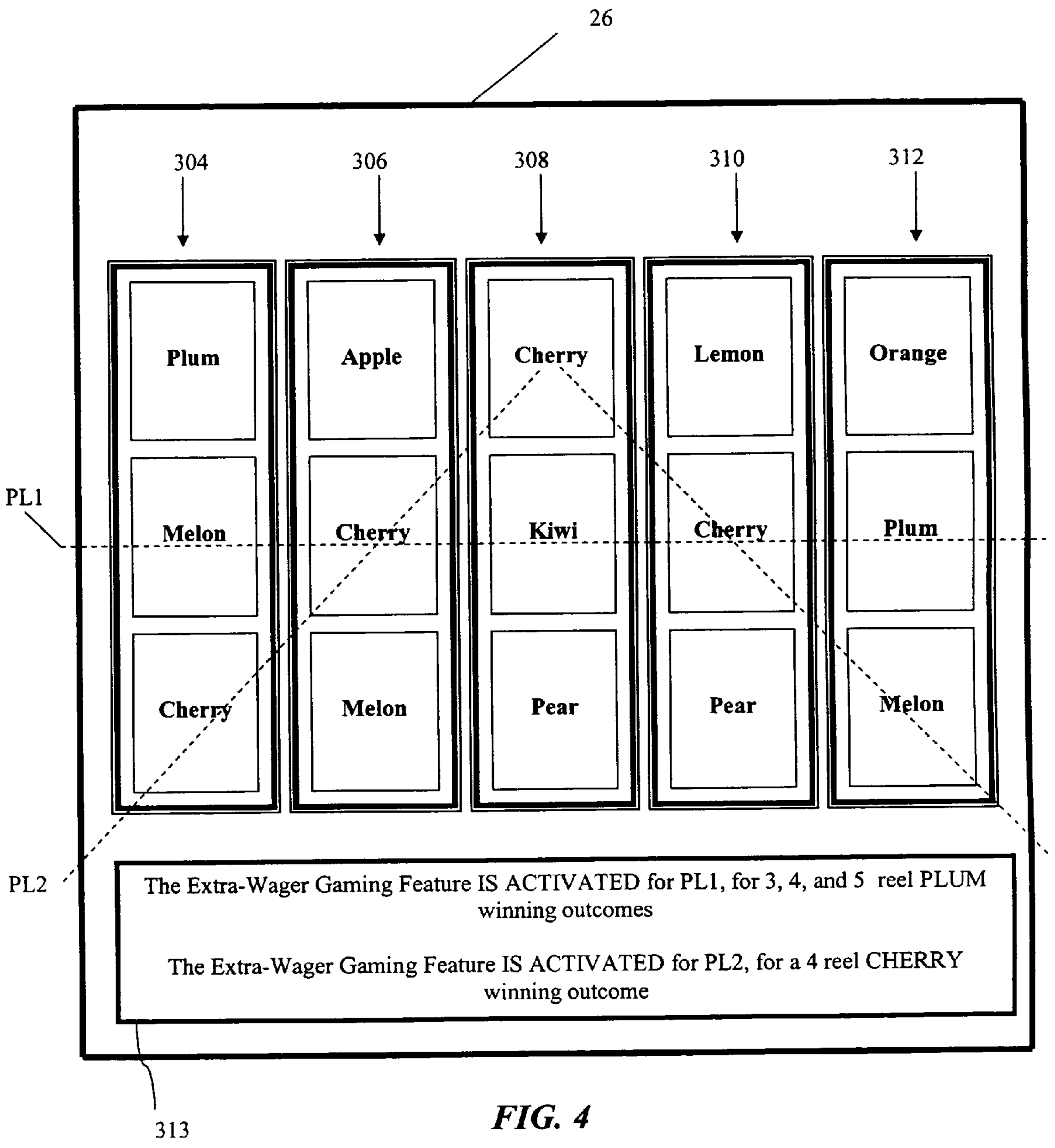
FIG. 4 shows an example of the gaming feature in accord with the present concepts.
Figure 5:
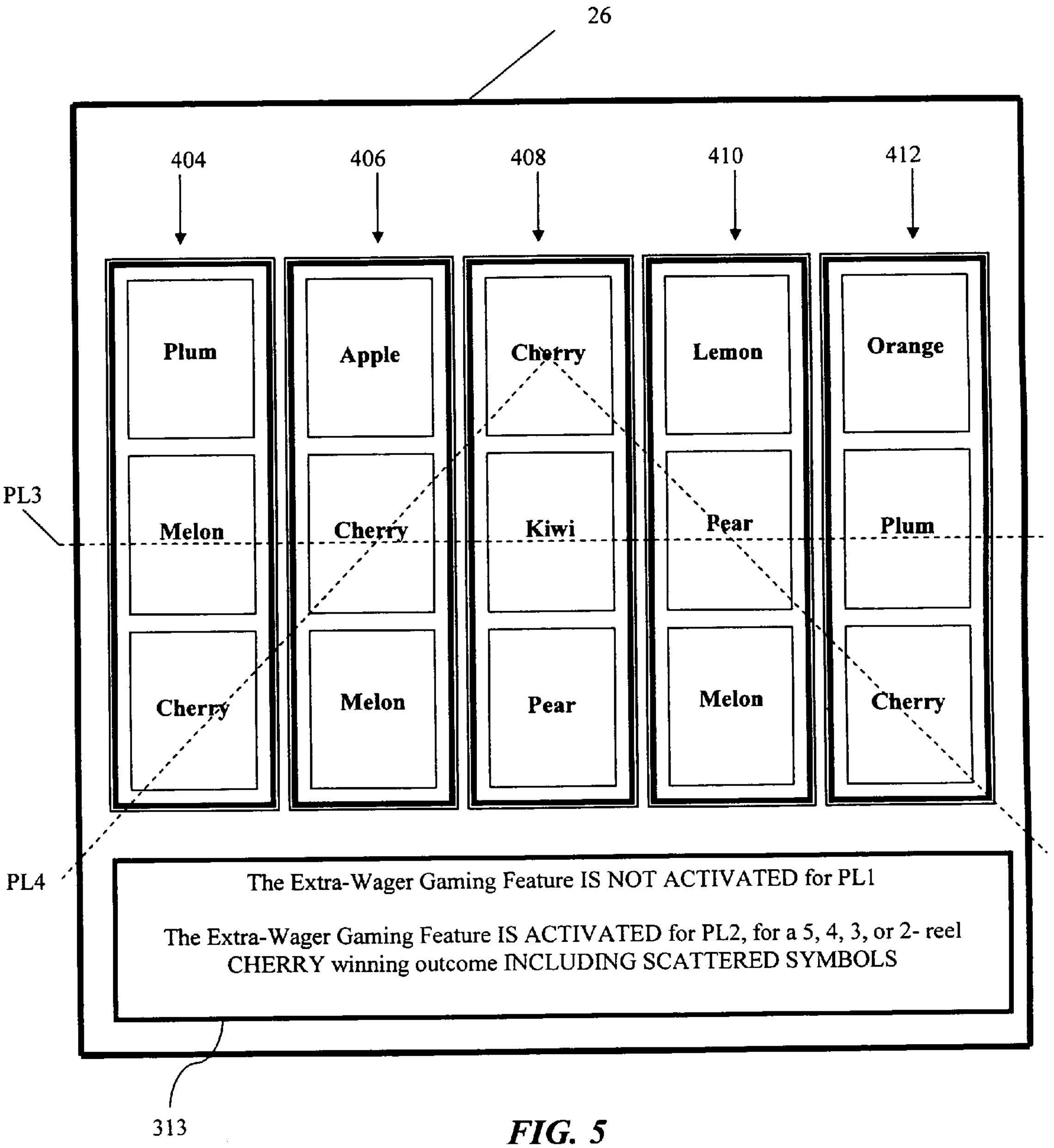
FIG. 5 shows another example of the gaming feature in accord with the present concepts.

FIGS. 4-5 show representations of various screen displays illustrative of the present concepts. These representations are clearly basic in nature and are not intended to constitute any commercial embodiment of or limitation on the present concepts, but are merely presented to illustrate various concepts of game play in accord with the present concepts.

FIG. 4 shows a representation of a main display 26 and a plurality of reels 304, 306, 308, 310 and 312, which bear any desired indicia, icons, images, or symbols (hereinafter "symbols"). A lesser or greater number of reels may be utilized. The reel symbols of FIGS. 4-5 reflect the fruit symbols denoted in FIGS. 3(*a*)-(*c*). The symbols may advantageously be tailored, for example, to reflect the theme of a particular game or games associated with the gaming terminal 10 or to reflect the casino owning or leasing the gaming terminal. For example, the symbols could reflect symbols and denominations from a deck of cards for a card-based game and the symbols could be stylized to suit the casino.

The display 26 may comprise a dot matrix, CRT, LED, LCD, electro-luminescent display or generally any type of video display known in the art, which may optionally serve as a data input device (e.g., a touch-screen). In this aspect, the reels 304, 306, 308, 310 and 312 may be computer-generated images of reels, with each reel comprising a plurality of symbols, which may be varied by the controller 60, such as the CPU 30 and associated gaming control system. Alternatively, the display 26 may comprise a semi-transparent or transparent window behind which traditional mechanical reels operate.

The gaming machine 10 is operable to play a basic wagering game and, optionally, a secondary or bonus game. The basic wagering game is implemented on the main display 26 with four, five, or more mechanical reels or video simulated spinning reels 304, 306, 308, 310, and 312, as appropriate with a plurality of paylines (e.g., nine paylines). Generally, game play is initiated by inserting a number of coins or playing a number of credits as a base wager via the card wager acceptor 16*a* and a cash wager acceptor 16*b*, shown in FIGS. 1-2.

Additional coins or credits may be optionally wagered to select one or more additional paylines to increase the player's odds of obtaining a winning combination upon a play of the base wagering game. The paylines encompass different combinations of reel symbols and each payline provides an opportunity for a player to achieve a winning combination through sequential or scattered symbols, as appropriate for a particular game or gaming terminal 10, along the payline. By way of example, a first payline PL1 in FIG. 4 is shown to include a first grouping of symbols along a horizontal line centered with respect to the displayed (portions of) reels 304, 306, 308, 310 and 312 so as to include the center symbols thereof (e.g., "MELON", "CHERRY", "KIWI", "CHERRY", and "PLUM", respectively, as shown). A second exemplary payline PL2 includes a second grouping of symbols along an angled line starting at the lower symbols (e.g., "CHERRY") on reel 304, extends through the center symbol (e.g., "CHERRY") on reel 306, the upper symbol (e.g., "CHERRY") on reel 308, the center symbol (e.g., "CHERRY") on reel 310 and terminates at the lower symbol (e.g., "MELON") on reel 312. The number of paylines is limited only by the number of potential combinations of displayed reel positions.

In one aspect, the wager in the basic wagering game can optionally be set for a maximum bet of 5 or 10 credits on each payline for a maximum total bet of 45 or 90 credits per game. The controller 60 activates a number of paylines corresponding to the number of coins or credits played or corresponding to a direct selection of such paylines by a player through an appropriate I/O device.

In accord with the present concepts, an extra wager can be placed prior to game play to increase the payout or award for a selected wagering game outcome comprising a related subgroup of combinations from the plurality of game outcomes. The extra wager could be, in one aspect, selectively placed on any available payline selected by the player in the basic wagering game. Additionally, the player may optionally be provided the opportunity to select via a main display 26 touch screen or other input device, for each payline or selected paylines, a specified combination of symbols (e.g,. 5 "CHERRY" symbols or 4 "CHERRY" symbols) or a related subgroup of combinations (e.g., 4, 3, and 2 "CHERRY" symbols) from among the plurality of winning outcomes, such as represented in FIGS. 3(*a*)-(*c*). The availability of the option to specify more than one combination of symbols may be optionally tied to an amount of the extra wager input by the player and may be, for example, limited to players placing minimum predetermined wagers in the basic wagering game, players activating a minimum predetermined number of paylines, and/or to players placing minimum predetermined extra wagers in the gaming feature.

The actual amount of the extra wager may comprise one or more tokens or credits. In a preferred aspect, the amount of the extra wager and the amount of the increased award outcome would be set to offset each other over the probability-weighted average of all possible outcomes of the chance event defined by the specified combination of symbols. In such aspect, the increased payouts attributable to this gaming feature or the requirement for the extra wager to activate the gaming feature can be set so that the "expected value" ("EV") of the gaming terminal 10, or the percentage of the total wager that the machine will pay out over the game cycle including the set of all possible outcomes, is not substantially affected by the gaming feature. In alternative aspects, the gaming feature may be advantageously utilized to adjust the EV of the gaming terminal 10. In one aspect, the multiplier or increased award outcome may comprise a multiplier (e.g., a doubled award) or a fixed amount.

After activation of the paylines, and input of the wagers for the basic wagering game and the extra wager to activate the gaming feature, the user may set the reels 304, 306, 308, 310, and 312 in motion by, for example, pulling a lever (not shown), pressing a push button, uttering an appropriate vocalization into a microphone, or touching a touch screen "key" on main display 26.

The controller 60 uses a random number generator, such as but not limited to CPU 30, to select a basic wagering game outcome corresponding to a particular set of reel "stop positions". The controller 60 then causes each of the reels 304, 306, 308, 310 and 312 to stop at a pre-selected stop position. Symbols corresponding to the wagering game outcome are displayed on the reels to graphically illustrate the reel stop position and indicate whether the stop position of the reels represents a winning game outcome. Winning wagering game outcomes (e.g., symbols combinations resulting in payment of coins or credits) are identifiable by a pay table, such as represented in FIGS. 3(*a*)-3(*c*), provided for the player's edification. The pay table may be affixed to the gaming terminal 10 and/or displayed by the main display 26 or secondary display 27 upon request. If the displayed symbols stop on a winning combination in the basic wagering game, the controller 60 outputs to the player the award corresponding to the award in the pay table for that combination multiplied by the amount of credits bet on the winning payline.

In the example of FIG. 4, the player of the gaming terminal 10 or system has placed an extra wager on each of the selected paylines PL1 and PL2 to increase an award for selected winning outcomes in the basic wagering game. As indicated by the on-screen pop-up or display 313, the player has activated the extra-wager gaming feature for payline PL1 for 3, 4, and 5-reel "PLUM" winning outcomes and has activated the extra-wager gaming feature for payline PL2 for a 4-reel CHERRY winning outcome. The display 26 shows the result of the play of the basic wagering game. In this example, the player has won an award for attaining the 4-of-a-kind in the basic wagering game on reels 306, 308, 310 and 312 that is greater than the award that the player would have received if the player had not placed the extra wager. No winning combination was present on payline PL1.

FIG. 5 shows another gaming terminal display 26 having five reels. In this example, an extra wager was placed only on payline PL4 to increase an award for a wagering game outcome comprising a 5, 4, 3, or 2-reel "CHERRY" winning outcome along payline PL4. The player has also elected to include scattered outcomes among the winning combinations. The specified combination of symbols is manifested as a scattered 4-of-a-kind ("CHERRY's") on reels 404, 406, 408, and 412 along payline PL4 and constitutes a win for the player in both the basic wagering game and in the gaming feature. The player would also have been eligible for the increased payout if the player had achieved, for example, a sequential or scattered 3-reel or 2-reel "CHERRY" winning combination along the selected payline PL4.

In accord with the above, a gaming system for playing a reel-based wagering game may be seen to comprise a gaming terminal 10 including one or more displays (e.g., 26) for displaying a basic wagering game and a basic wagering game outcome, wherein the basic wagering game has a number of outcomes, a subset of which correspond to winning outcomes in the basic wagering game. A gaming feature is provided for increasing an award for a basic wagering game winning outcome comprising a selected wagering game outcome or a selected grouping of wagering game outcomes, which may comprise a selected subgroup of combinations from the plurality of game outcomes.

The gaming feature is enabled by an enabling event comprising, for example, an input of an extra or additional wager supplemental to that of the wager in the basic wagering game. The controller 60 associated with the gaming terminal 10 is configured, upon execution of corresponding instructions, to randomly select a basic wagering game outcome from the plurality of basic wagering game outcomes, determine whether the randomly selected basic wagering game outcome corresponds to a winning outcome in the basic wagering game, and determine whether the basic wagering game winning outcome comprises a combination of symbols along any of the selected paylines. The controller 60 is also configured to, upon execution of corresponding instructions, associate a winning outcome in the basic wagering game with a first award corresponding to the winning outcome in the basic wagering game or a second award corresponding to a winning outcome in the basic wagering game wherein the gaming feature is activated by an extra bet. The second award would be greater than the first award. The manner of the association between the winning combination and the increased payout is not limited in any manner, so long as the extra wager yields an increased payout for any given winning combination above the payout ordinary associated with that winning combination. The controller 60 is also configured to output a signal corresponding to the first or second award to one or more of a display, gaming terminal payout mechanism, magnetic card writing device, negotiable instrument printer, controller, and/or memory device.

Likewise, the present concepts embrace a wagering system or method including the steps of randomly selecting a basic wagering game outcome from a plurality of potential basic wagering game outcomes, determining whether the randomly selected basic wagering game outcome corresponds to a basic wagering game winning outcome and, if so, determining whether the wagering game winning outcome comprises the specified combination of symbols comprising a selected basic wagering game outcome, a plurality of selected basic wagering game outcomes, or a selected group and related subgroup of basic wagering game combinations from the plurality of game outcomes. The method includes determining whether the gaming feature is enabled and, for an enabled gaming feature, determining whether the randomly selected basic wagering game outcome comprises the specified combination of symbols along a payline.

Such wagering system or method also includes the steps of associating, for an enabled gaming feature, a winning combination in the basic wagering game comprising the specified combination of symbols along a payline with an increased award and outputting a signal corresponding to the increased award.

While the present invention has been described with reference to one or more particular embodiments, those skilled in the art will recognize that many changes may be made thereto without departing from the spirit and scope of the present concepts. Each of these embodiments and obvious variations thereof is contemplated as falling within the spirit and scope of the claimed invention, which is set forth in the following claims.

What is claimed is:

1. A gaming system for playing a basic wagering game on a gaming terminal, comprising:

an input device adapted to receive an input from a player of a basic wagering game and output a signal to a controller;

a controller configured to randomly select a basic wagering game outcome and to display on a display the basic wagering game outcome responsive to a wager input and a player input to initiate the basic wagering game; and a gaming feature associated with basic wagering game in which a first side wager is input prior to the display of the basic wagering game outcome in association with a player-selected first outcome on a first set of selected paylines and a second side wager is input prior to the display of the basic wagering game outcome in association with a player-selected second outcome on a second set of selected paylines, wherein first set of selected paylines is different than the second set of selected paylines.

2. The gaming system of claim 1, wherein the first set of selected paylines comprises a plurality of paylines.

3. The gaming system of claim 2, wherein second set of selected paylines comprises a plurality of paylines.

4. The gaming system of claim 1, wherein the first outcome and the second outcome are selected from a plurality of predefined outcomes.

5. The gaming system of claim 1, wherein the gaming feature is enabled only when all paylines are active.

6. The gaming system of claim 1, wherein the first outcome or the second outcome comprises a basic wagering game winning outcome.

7. The gaming system of claim 6, wherein the first outcome and the second outcome each comprise a basic wagering game winning outcome.

8. The gaming system of claim 6, wherein the first outcome or the second outcome comprises one of a 5-of-a-kind, 4-of-a-kind, 3-of-a-kind, and a 2-of-a-kind in any sequence.

9. The gaming system of claim 1, wherein the controller is disposed within the gaming terminal.

10. A gaming system for playing a basic wagering game, comprising:

a gaming terminal including a display for displaying a basic wagering game and a basic wagering game outcome, said basic wagering game having a plurality of basic wagering game outcomes, a subset of the plurality of basic wagering game outcomes corresponding to winning outcomes in the basic wagering game, said basic wagering game including a gaming feature for increasing an award for a basic wagering game winning outcome comprising a specified combination of symbols along a payline, said specified combination of symbols along a payline comprising at least one of a selected basic wagering game winning combination, a plurality of selected basic wagering game winning combinations, and a selected related group and subgroup of basic wagering game winning combinations from the plurality of basic wagering winning game combinations, said gaming feature being enabled by an input of an additional wager;

a controller associated with said gaming terminal and being configured, upon execution of corresponding instructions, to randomly select a basic wagering game outcome from the plurality of basic wagering game outcomes;

conduct a basic wagering game responsive to a wager input, a player input designating at least one payline as an active payline, and a player input to initiate the basic wagering game;

enable a gaming feature responsive to a side wager to the basic wagering game, comprising receiving an input designating, for a specified active payline, a player-specified combination of symbols;

determine whether the randomly selected basic wagering game outcome corresponds to a winning combination in the basic wagering game;

determine whether the gaming feature is enabled;

determine, for an enabled gaming feature, whether the randomly selected basic wagering game outcome comprises the player-specified combination of symbols along the specified active payline;

award an award for any winning outcome in the basic wagering game occurring along an active payline; and award an award for a player-specified combination of symbols occurring along a specified active payline in association with an enabled gaming feature.

11. The gaming system of claim 10, wherein said controller is further configured, upon execution of corresponding instructions, to enable the gaming feature only if all paylines are active.

12. The gaming system of claim 11, wherein said controller outputs said signal corresponding to the increased award to at least one of a display, gaming terminal payout mechanism, magnetic card writing device, negotiable instrument printer, controller, and memory device.

13. The gaming system of claim 10, wherein said controller is external to said gaming terminal.

14. The gaming system of claim 10, wherein said controller is internal to said gaming terminal.

15. The gaming system of claim 10, wherein the outcome designated by the player comprises a winning combination in the basic wagering game.

16. The gaming system of claim 10, wherein the controller is further configured, upon execution of corresponding instructions, to prompt, for an enabled gaming feature, a player to designate a plurality of outcomes and a corresponding plurality of specified paylines to be associated with the side wager; and determine, for an enabled gaming feature, whether one or more of the outcomes designated by the player occurs on a corresponding one of the specified paylines.

17. The gaming system of claim 16, wherein at least one of the plurality of outcomes designated by the player in association with the side wager comprises a winning combination in the basic wagering game.

18. A method of operating a gaming terminal, comprising:

attributing a first wager from a player for a basic wagering game on said gaming terminal to at least one payline;

receiving a second wager from the player for a gaming feature associated with the basic wagering game;

enabling the gaming feature associated with the basic wagering game responsive to the second wager;

associating the enabled gaming feature with a player-specified combination of symbols along a specified active payline comprising one of a selected basic wagering game outcome, a plurality of selected basic wagering game outcomes, or a selected group and related subgroup of basic wagering game combinations from a plurality of basic wagering game winning outcomes;

awarding an award for any winning outcome in the basic wagering game occurring along an active payline; and awarding an award for a player-specified combination of symbols occurring along a specified active payline in association with the enabled gaming feature.

19. A method of operating a gaming terminal according to claim 18, further comprising the acts of:

prompting a player to designate a plurality of player specified outcomes and a corresponding plurality of the specified active paylines to be associated with the side wager; and determining whether a player specified outcome occurs on a corresponding one of the specified active paylines.

20. A method of operating a gaming terminal according to claim 19, further comprising the act of:

receiving a second wager comprising a side wager only when all paylines are active.

21. A method of operating a gaming terminal according to claim 18, wherein the player specified outcome comprises a winning outcome in the basic wagering game.

22. A method of operating a gaming terminal according to claim 20, wherein at least one of the player specified outcomes comprises a winning outcome in the basic wagering game.

* * * * *